United States Patent [19]

O'Toole et al.

[11] 3,979,017

[45] Sept. 7, 1976

[54] ARTICLE DISPENSING APPARATUS

[75] Inventors: Francis Charles O'Toole, Lafayette Hill; Charles Philip Comeau, Oreland, both of Pa.

[73] Assignee: Captain International Industries, Inc., Montgomeryville, Pa.

[22] Filed: June 11, 1975

[21] Appl. No.: 586,102

[52] U.S. Cl. .................................................. 221/7

[51] Int. Cl.[2] .......................................... B65G 1/12

[58] Field of Search ............ 221/78, 5, 2, 155, 106, 221/120, 122; 194/10, 51, 59, 65

[56] References Cited

UNITED STATES PATENTS

| | | | |
|---|---|---|---|
| 2,991,866 | 7/1961 | James et al. | 194/51 X |
| 3,122,401 | 2/1964 | Johnson | 221/121 X |
| 3,310,198 | 3/1967 | Regan et al. | 221/7 |

*Primary Examiner*—Stanley H. Tollberg
*Attorney, Agent, or Firm*—Seidel, Gonda & Goldhammer

[57] ABSTRACT

Article dispensing apparatus for use in a hotel room or the like includes an article support such as a rotatable carousel having a plurality of compartments. Access to any individual compartment is attained by means of a door on the apparatus. A detent means prevents the door from being opened unless the carousel is in a dispensing position. Opening of the door to attain access to an article causes an interlock to latch the carousel in the dispensing position and simultaneously produces a record of the value of an article in the compartment opposite the door when the door was opened.

13 Claims, 12 Drawing Figures

FIG. 6
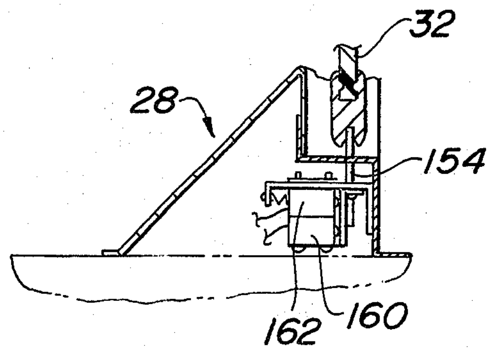
FIG. 8
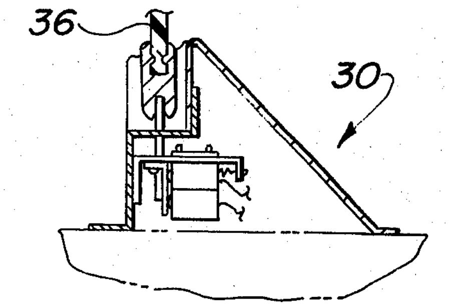
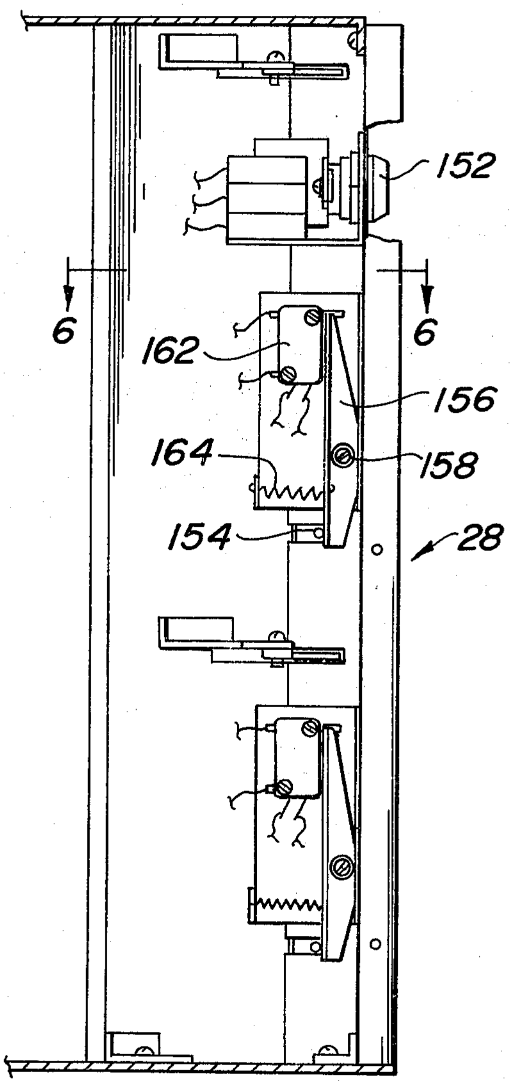
FIG. 5
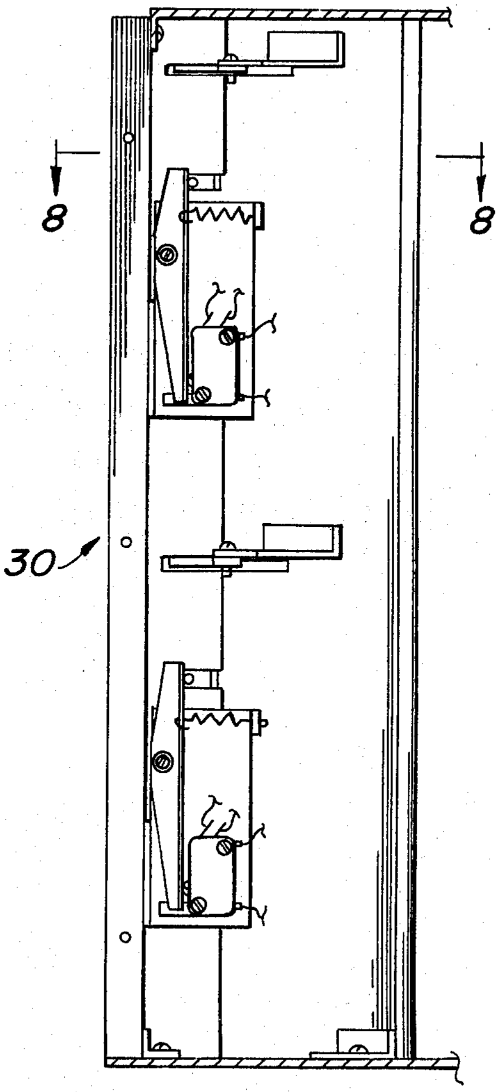
FIG. 7

FIG. 10
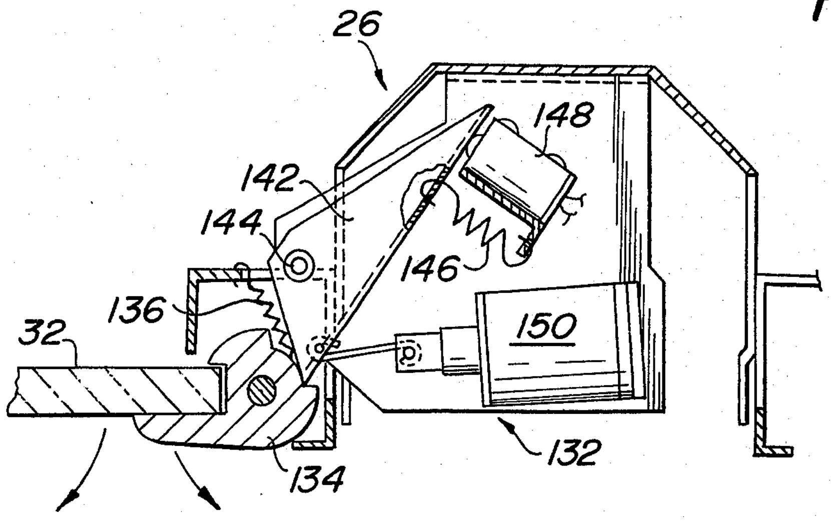
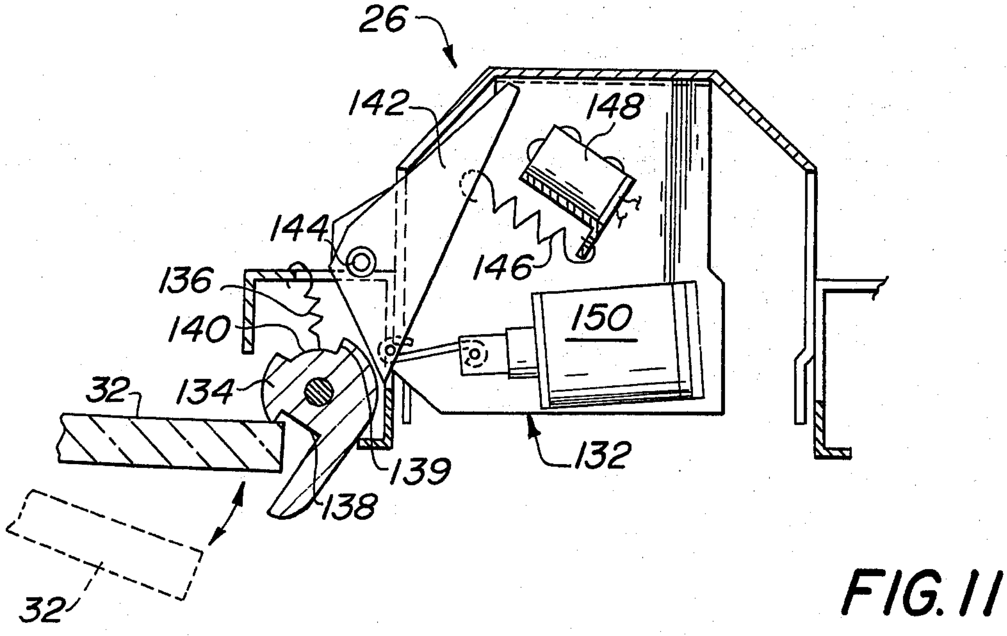
FIG. 11

ARTICLE DISPENSING APPARATUS

BACKGROUND

This invention relates to an article dispensing apparatus of the type classified in Class 221 and exemplified by U.S. Pat. No. 3,310,198. As disclosed in said patent, the dispensing apparatus may be located in a hotel room or the like whereby a key is necessary to connect electrical power to the apparatus. A customer is permitted to select and purchase a variety of different articles. Dispensing of the article is automatically registered at some remote location to facilitate billing the customer.

While the apparatus disclosed in said patent has operated satisfactorily, the present invention seeks to improve the same by minimizing the number of components, by simplifying the construction, and by otherwise structurally interrelating components which minimize the possibility of pilfering and maintenance.

This invention is directed to article dispensing apparatus which includes a housing within which is disposed one or more movable article supports. The article support has a plurality of compartments. Each compartment is open on one side thereof. A movable door on the housing is disposed opposite the open side of one of said compartments.

An interlock is supported by the housing for latching the article support in a dispensing position when one of the compartments has its open side opposite said door and dispensing is initiated. A lock means is provided on the housing for locking the door in a closed position. A detent means is supported by the housing and coupled to said lock means for causing the lock means to block any opening movement of the door unless said article support is latched in a dispensing position by said interlock. A means is provided, responsive to opening of said door, for causing the interlock to latch said article support in its dispensing position and for simultaneously producing a record of the compartment opposite the door when the door was opened.

The components of the apparatus as described above are structurally interrelated in a manner so as to achieve a dispensing apparatus which minimizes maintenance, minimizes the number of components, and is structurally interrelated to minimize pilfering. These objects and advantages are attained by providing the dispensing apparatus which is compact while at the same time provides for selection of a substantial number of articles.

Other objects and advantages will appear hereinafter.

For the purpose of illustrating the invention, there is shown in the drawings a form which is presently preferred; it being understood, however, that this invention is not limited to the precise arrangements and instrumentalities shown.

FIG. 5 is an end view taken along the line 5—5 in FIG. 4.

FIG. 6 is a sectional view taken along the line 6—6 in FIG. 5.

FIG. 7 is an end view taken along the line 7—7 in FIG. 3.

FIG. 8 is a sectional view taken along the line 8—8 in FIG. 7.

FIG. 10 is a sectional view taken along the line 10—10 in FIG. 3.

FIG. 11 is a view similar to FIG. 10 but showing the components in an opened disposition.

Referring to the drawing in detail, wherein like numerals indicate like elements, there is shown in FIG. 1 an article dispensing apparatus in accordance with the present invention designated generally as 10.

Figure 1:
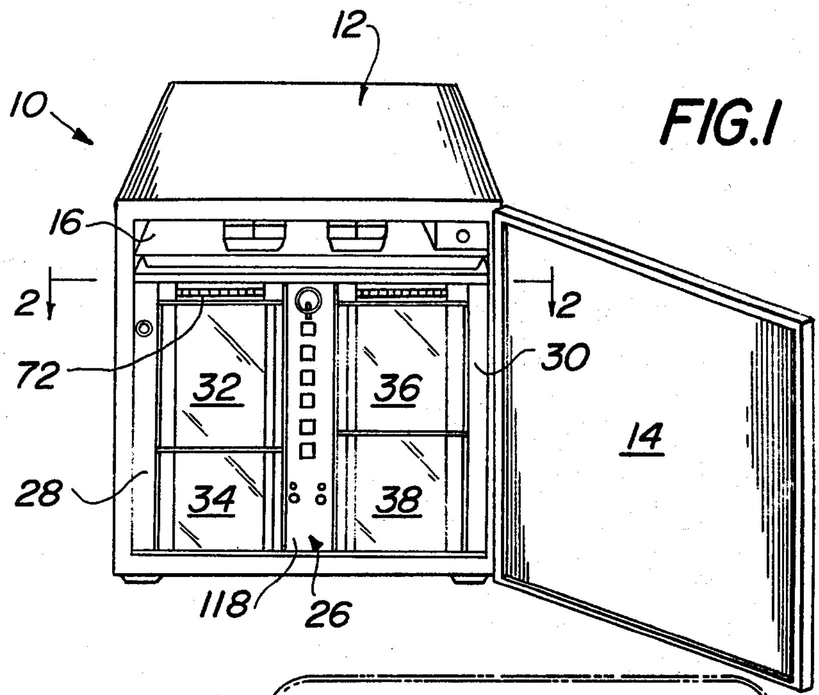
FIG. 1 is a perspective view of apparatus in accordance with the present invention with a main door in an open position.

The apparatus 10 includes a housing designated generally as 12. The housing 12 is made from an appropriate material with any desired outer protective coatings. For example, the housing may be provided with an outer veneer simulating wood whereby the housing 12 has the external appearance of a piece of furniture. Housing 12 is provided with a main door 14 pivotably secured along one edge and having dimensions corresponding to the height and width of the housing 12.

Within the housing 12, adjacent the upper end, there is provided a refrigerated compartment 16 having ice cubes and storage space.

Within the housing 12, there is provided a dispensing chamber defined at its upper end by a top partition wall 18 and at it lower end by a bottom partition wall 20. See FIGS. 2 and 9. Walls 18 and 20 are preferably of sheet metal stamped, slotted, or otherwise bent to the desired shape to accommodate various mechanisms to be described hereinafter. Within the dispensing chamber, there is provided a pair of carousels 22 and 24 rotatable about vertical axes and disposed alongside one another. The housing 12 adjacent the front end thereof is provided with a center column 26 and side columns 28 and 30. The side column 28 pivotably supports one side edge of transparent access doors 32 and 34 which are disposed one above the other. See FIGS. 1 and 9. The side column 30 pivotably supports one side edge of transparent access doors 36 and 38 which are disposed one above the other. None of doors 32–28 has a handle.

The doors 32 and 34 facilitate access to the carousel 22. Doors 36 and 38 facilitate access to the carousel 24. Door 32 is taller than door 34 and door 36 is taller than door 38. The purpose of the difference in the size of the doors will be made clear hereinafter.

The carousels 22 and 24 are identical. Accordingly, only carousel 22 will be described in detail. The carousel 22 includes first and second semicircular halves joined together in any convenient manner so as to provide a hollow central core 40 with a plurality of shelves 42, 44, 46, 48, 50 and 52 extending radially outwardly from the core 40. As illustrated, the shelves 42–52 are closer to the lower end of the carousel so that compartments will be defined in the manner with large compartments above the shelves 42–52 uniformly distributed about the periphery of the carousel 22 with smaller compartments therebelow and defined at their lower end in a manner to be described hereinafter.

Each compartment on the outer periphery of the carousel 22 is defined by a shelf, a wall of the core 40, and a pair of radially outwardly extending partitions 54, 56, 60, 62, and 64. Thus, each compartment will have an open side which is adapted to be juxtaposed to one of the doors 32, 34. In the illustrated embodiment, the carousel 22 has six upper compartments and six lower compartments for a total of 12 compartments. Access to said 12 compartments is attained by one or both of the doors 32, 34.

A circular end cap 66 is secured to the bottom end of the core 40. The cap 66 includes a boss 68 telescoped into the core 40 and rotatably supported by a pin 70 from the bottom partition wall 20. See FIG. 9. Cap 66 also provides the set of lower shelves comparable to shelves 42–52. Thus, in FIG. 9 corresponding shelves are designated by the numerals 42' and 48'.

A top end cap 72 is provided. Cap 72 has a boss 74 force-fit or otherwise retained within the core 40. The boss 74 on cap 72 is rotatably supported by a pin 76 on the top partition wall 18.

Figure 9:
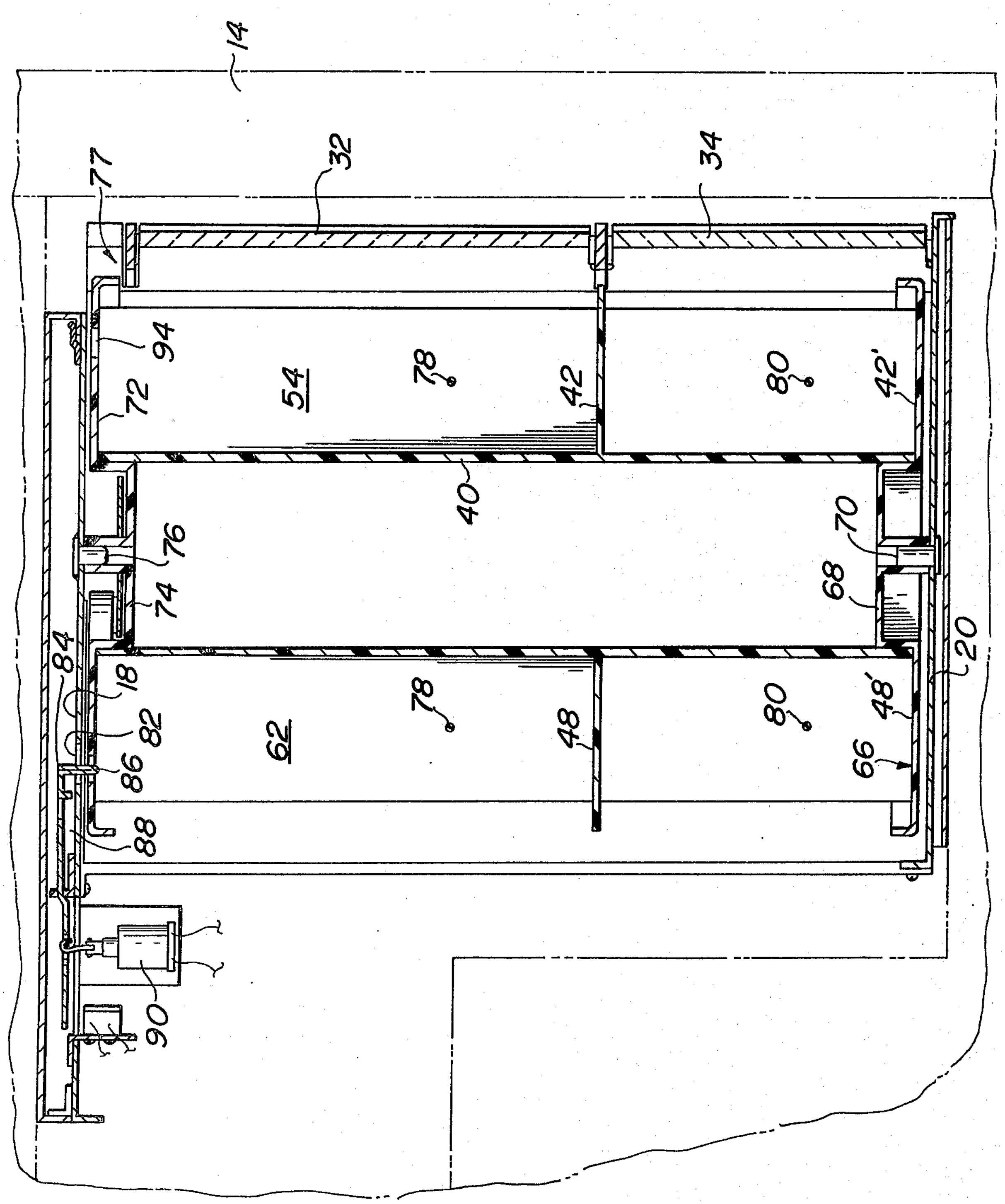
FIG. 9 is a sectional view taken along the line 9—9 in FIG. 4.

As shown in FIG. 9, the front wall of the housing is provided with a recess 77 so that a chord of the top cap 72 projects therethrough. Also, see FIG. 2. The projecting chord of cap 72 is adapted to be manually rotated by the customer. The outer peripheral surface on cap 72 is provided with ribs so that the customer's thumb will have good frictional contact. The bosses 68 and 74 have the same non-circular configuration as the core 40 whereby rotation of end cap 72 will rotate the carousel 20 about the axis of pins 70, 76. Such rotation of carousel 22 places the open side of a compartment on the carousel 22 opposite door 32 with another compartment similarly positioned opposite door 34.

An elastomeric cord 78 extends through each of the partitions 54–64 above the shelves 42–52. See FIGS. 4 and 9. The cord 78 prevents articles from falling out of their respective compartments when the carousel 22 is rotated. A similar elastomeric cord 80 extends through said partitions 54–64 below the shelves 42–52. See FIG. 9.

Figure 2:
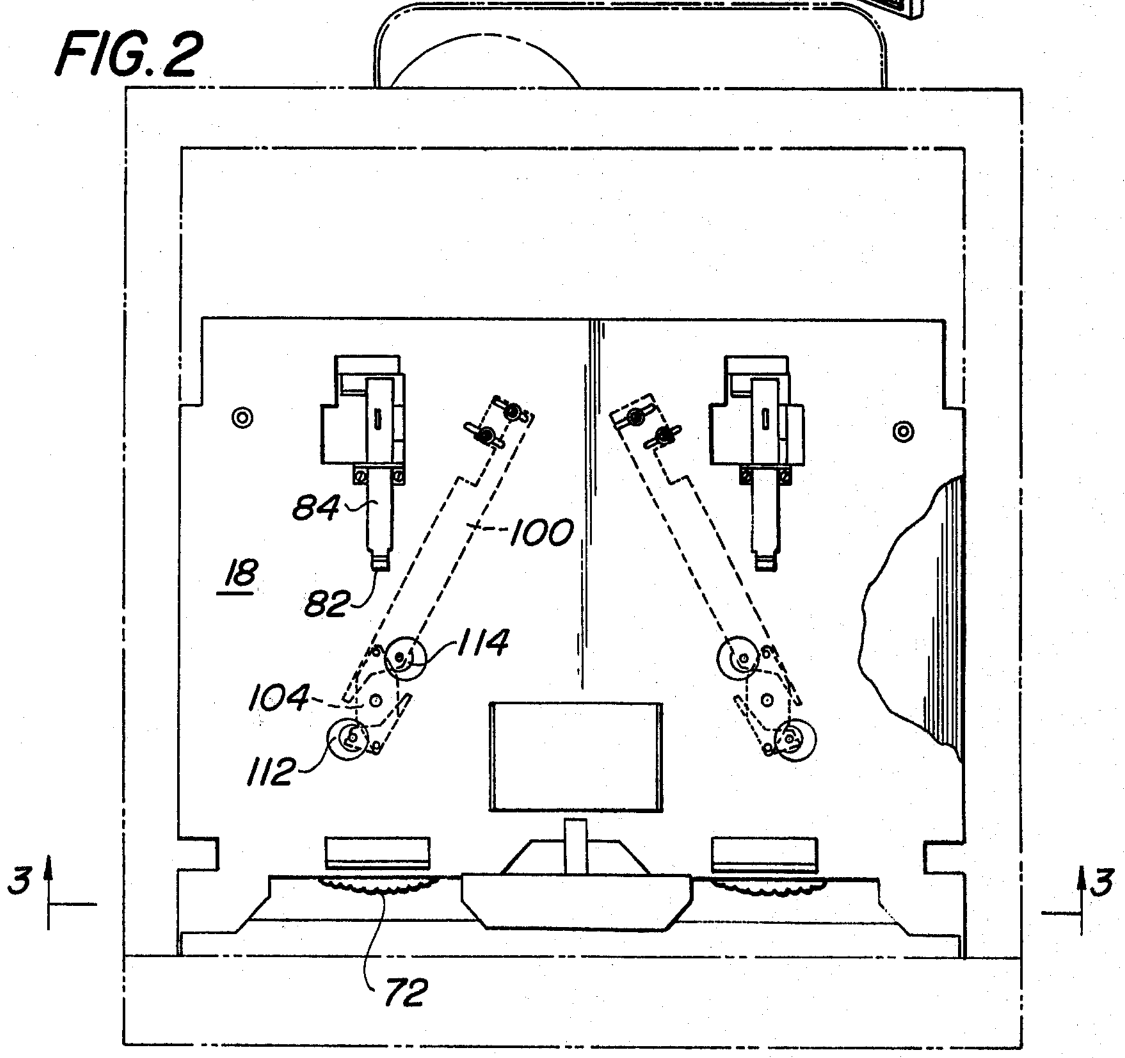
FIG. 2 is a sectional view taken along the line 2—2 in FIG. 1.

Referring to FIGS. 2 and 9, the top partition wall 18 is provided with a slot 82 therein. A tab 86 on an interlock 84 extends through the slot 82 and through one of a plurality of slots 94. One such slot 94 is provided for each of the compartments above shelves 42–52. See FIG. 4.

The tab 86 is biased to a position wherein it extends through the aligned slots 82 and 94 by means of a spring such as leaf spring 88. A middle portion of the interlock 84 is pivotably supported by the top partition wall 18 with its end remote from the tab 86 being coupled to a solenoid 90. Solenoid 90 is supported by a struck-out bracket from the partition wall 18. The carousel 22 is free to rotate only when the tab 86 has been withdrawn from one of the slots 94 which is disposed opposite the slot 82.

Figure 4:
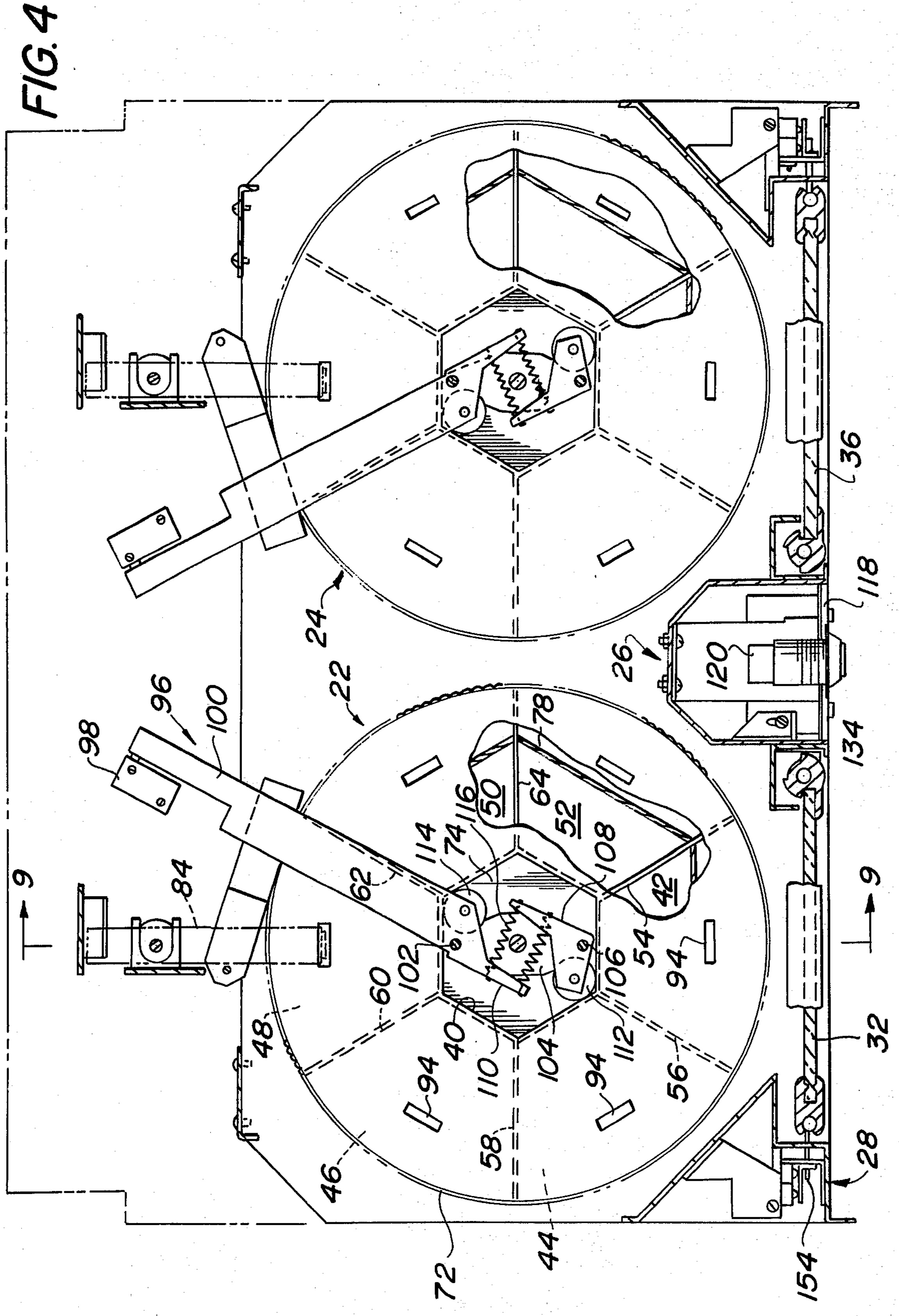
FIG. 4 is a sectional view taken along the line 4—4 in FIG. 3.

Referring to FIG. 4, each of the carousels 22, 24 is provided with a detent arm assembly designated generally as 96 and associated with a control switch 98. The assembly 96 includes an arm 100 which makes and breaks contact with the switch 98 whenever the carousel 22 is rotated from its dispensing position, regardless of the direction of rotation.

The arm 100 is supported by the top partition wall 18 for rotation about the pin 102. A plate 104 is secured to the top partition wall 18 and is parallel thereto but spaced therefrom by means of pin 102 and a pin 106. The length of plate 104 is sufficiently short so that it may be disposed within the boss 74 on the top end cap 72.

A bell crank 108 is pivotably secured to the plate 104 by means of pin 106. A roller 112 is supported by the bell crank 108 at one end thereof. A roller 114 is rotatably supported by the arm 100 at the same elevation as roller 112.

Arm 100 has an extension 110 parallel to the long arm of the bell crank 108. One or more springs 116 extend between the long arm of bell crank 108 and extension 110. The rollers 112 and 114 are rotatably supported about a vertical axis at diametrically opposite corners within the boss 74, in contact with two sides of the hexagonal interior surface of the boss 74. Hence, regardless which direction the carousel 22 is rotated, it will cause the arm 100 to break contact with the switch 98. The significance of the opening and closing of switch 98 will be made clear hereinafter.

Figure 3:
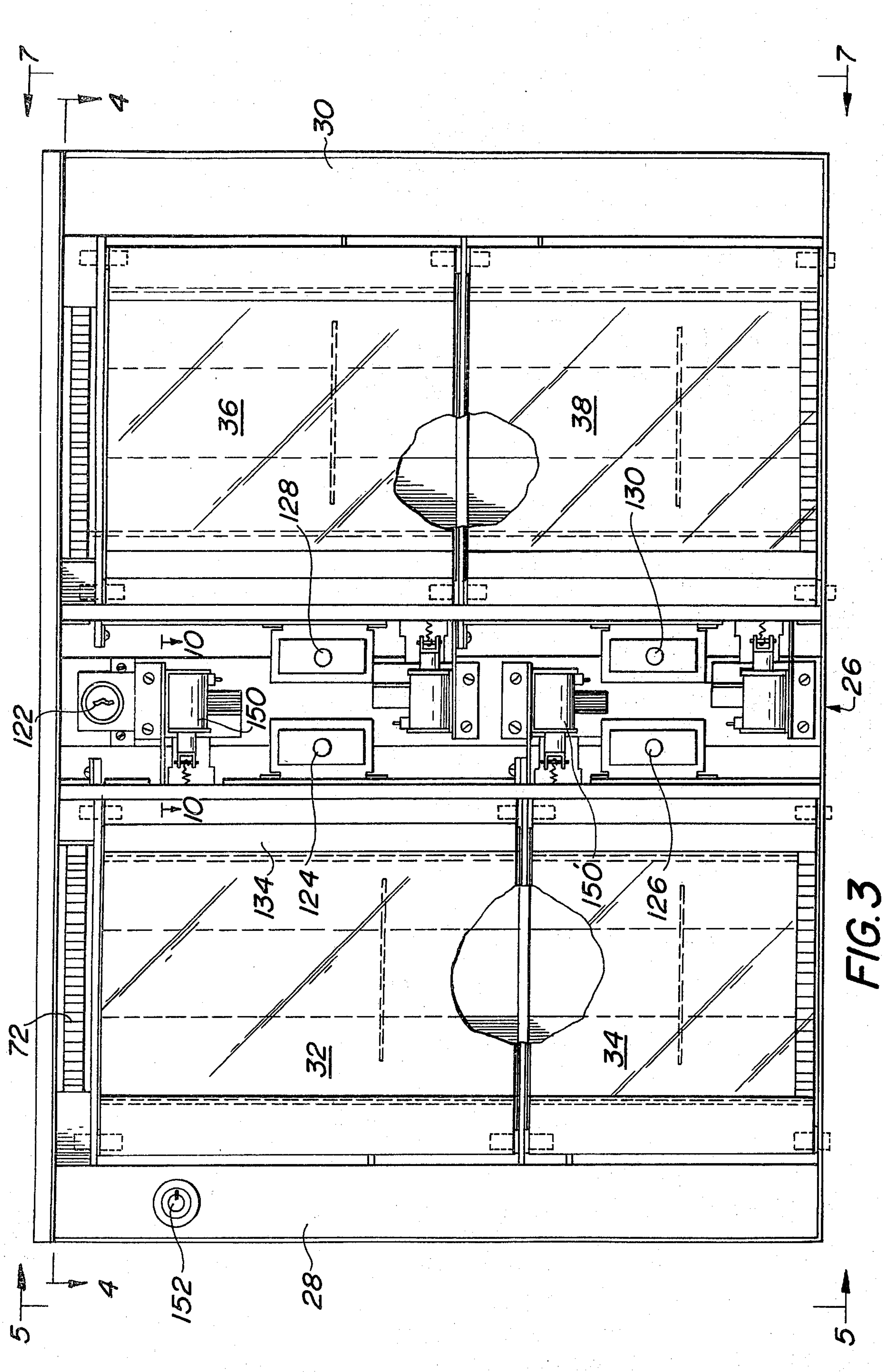
FIG. 3 is a sectional view taken along the line 3—3 in FIG. 2.

Referring to FIGS. 1 and 4, it will be noted that the central column 28 has a face plate 118. In FIG. 3, the face plate 118 has not been illustrated. The central column 26 includes a plurality of selection buttons 124, 126, 128 and 130. One such selection button is provided for each of the doors 32–38. Since the relation of each selection button, as well as its associated components, for operating one of the doors 32–38 are identical, such structure will only be described herein in connection with door 32.

Referring to FIGS. 10 and 11, initally it should be noted that the door 32 does not have a discrete handle. As will be described hereinafter, when an operator pushes on button 142, the door 32 will pop open under spring pressure. As shown in FIGS. 10 and 11, the door 32 is provided with a latch means designated generally as 132. Latch means 132 includes a vertically disposed latch 134 suitably supported by the housing 12 for rotation about a vertical axis adjacent the right hand edge of the door 32 as seen in FIG. 3.

The latch 134 is spring biased to the position shown in FIG. 11 by the spring 136. The latch 134 has a jaw 138 defined by a short leg which embraces the inner surface of door 32 and a long leg which embraces the outer surface of the door 32. The latch 134 is provided, generally opposite the jaw 138, with a notch 140 on its outer peripheral surface.

The notch 140 is defined along one side by a shoulder 139. A triangularly shaped lever 142 is provided for rotation about the pin 144. One corner of the lever 142 contacts the shoulder 139 and prevents the spring 136 from moving the latch 134 from the position shown in FIG. 10 to the position shown in FIG. 11.

The lever 142 is spring biased to the position shown in FIG. 10 by a spring 146 to thereby close switch 148. The lever 142 is coupled to a solenoid 150. Actuation of solenoid 150 pivots the lever 142 from the position shown in FIG. 10 to the position shown in FIG. 11 thereby expanding the spring 146. When this occurs, the corner of the lever 142 no longer blocks the shoulder 139 whereby the spring 136 contracts and pivots the latch 134 from the position shown in FIG. 10 to the position shown in FIG. 11. Such pivotable movement of the latch 134 imparts an opening movement to the door 32.

The door 32 is supported for pivotable movement by a suitable hinge adjacent its left hand edge portion in FIGS. 1 and 3. A side column 28 on the housing 12 adjacent the hinge for the door 32 includes a key operable lock 152. Insertion of a key in lock 152 constitutes a bypass for the entire apparatus to thereby facilitate maintenance, restocking of the compartments, etc.

As shown in FIGS. 5 and 6, the door 32 has an extension 154 which may in the form of a pin or rod. The extension 154 extends into the side column 28 and pivots lever 156 about pin 158 to the position shown in FIG. 5. Such movement also expands spring 164 connected to a bracket at one end and at its other end to the lever 158. Thus, the spring 164 tends to rotate the lever 156 in a clockwise direction in FIG. 5 and thereby impart a force to the extension 154 and door 32 in an opening direction of the door 32. Hence, springs 136 and 164 cooperate together to pivot the door 32 to an open disposition.

The lever 156 makes and breaks contacts with a pair of switches 160, 162 thereabove in FIG. 5. Switch 160 is connected to a pricing register for producing a record indicative of the compartment from which an article has been dispensed to thereby facilitate billing the customer.

The housing 12 may be compact in that its height, width and depth are each approximately 21 inches. With the housing having those dimensions, it is possible to make the carousels 22 and 24 with a diameter of about 9 inches. As will be apparent from FIG. 4, the carousels are sufficiently close to the center column 26 and the side columns 28, 30 whereby only one compartment is accessible when its associated door is opened. Each of the compartments preferably has a depth of about 2½ inches so that it may accommodate a wide variety of articles such as peanuts, bottled beer and/or liquors, snacks, candy, etc. Each carousel has a preferred height of about 14 inches.

Figure 12:
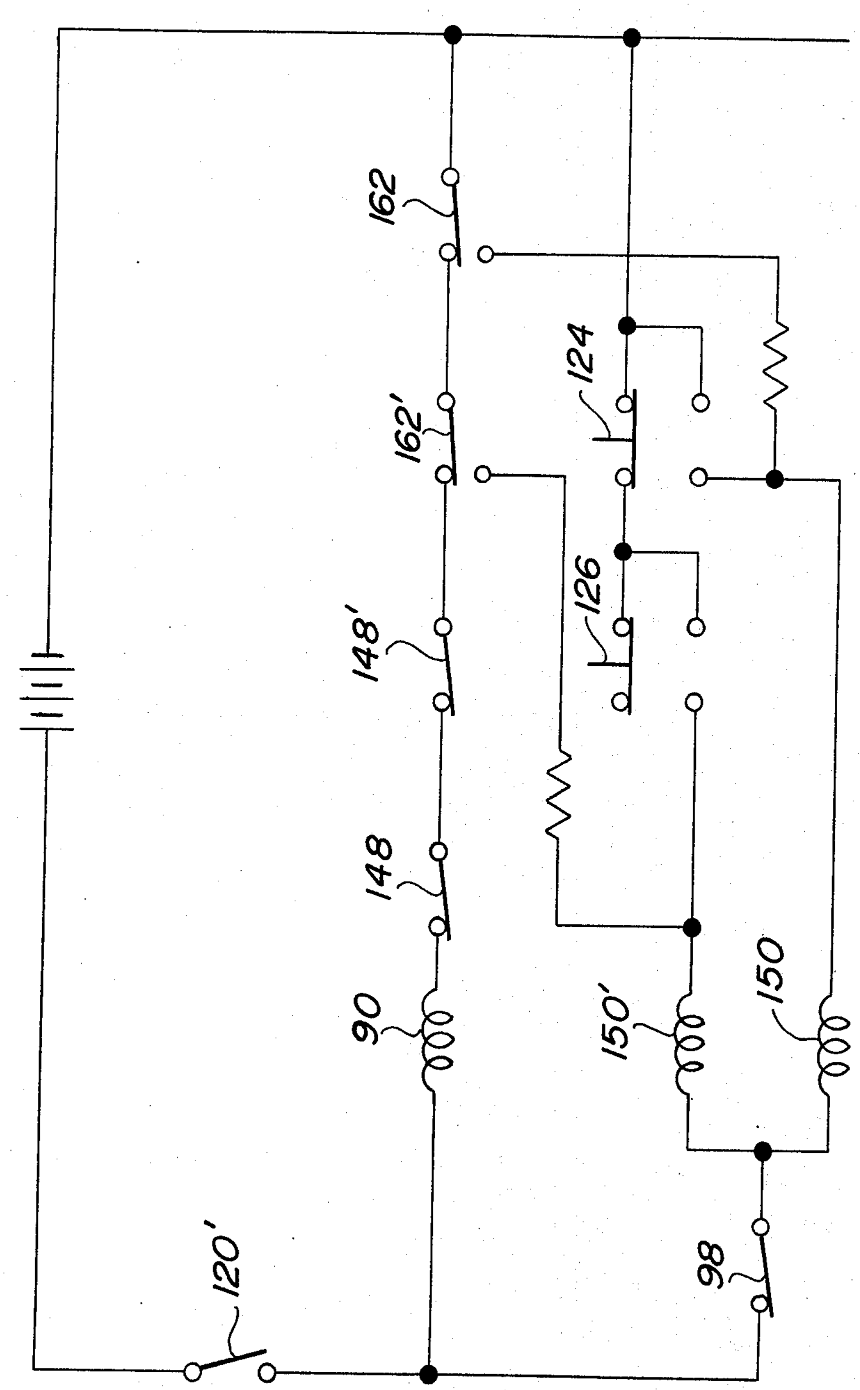
FIG. 12 is a diagrammatic illustration of electrical circuitry.

The operation of the apparatus 10 and the description of the circuitry in FIG. 12 is as follows. It will be assumed that the apparatus 10 is prominently displayed in a hotel room or the like. The customer for that particular room has a key which fits the apparatus 10. When the key is inserted into the key hole 122 of lock 120 on the center column 26, electrical power is coupled to the various components of the apparatus 10.

The customer may now make a selection. By engaging the exposed portion of the top end cap 72, see FIGS. 1 and 3, the customer may rotate the carousel until the desired article is observed in a compartment opposite the transparent doors such as door 32. The carousel 22 was free to rotate in view of the fact that lock 120 closed switch 120'. See FIG. 12. Solenoid 90 is in series with switches 148, 148', 162' and 162. Switch 148' is associated with solenoid 150' on the central column 26 and control door 34 in the same manner that switch 148 and solenoid 150 control door 32. All switches in FIG. 12 are shown in their normal position. The coupling of power from the DC source of 24 volts to the circuitry apparatus 10 shown in FIG. 12 operated the solenoid 90 thereby withdrawing the tab 86 from one of the slots 94 in top end cap 72 against the pressure of leaf spring 88.

Rotation of the carousel 22 in either direction causes arm 100 to break the contacts of switch 98 whereby electrical power to the solenoids 150, 150' is interrupted. See FIG. 12. Hence, it is not possible to open the door 32 while the carousel 22 is being rotated or when the carousel 22 is in a stationary position but there is misalignment between each of the slots 94 with respect to the slot 82.

Let it be assumed that the carousel 22 has been rotated to cause the open side of one compartment to be juxtaposed to the door 32. Also, let it be assumed that the article visible through door 32 is the article which the customer desires. Under these conditions, one of the slots 94 will be directly opposite the slot 82. Switch 98 will be closed by arm 100. When the customer pushes the release button 124, the following will occur simultaneously: (a) solenoid 150 will rotate lever 142, (b) springs 136 and 164 will cause the door 32 to pop open, (c) power to the solenoid 90 will be interrupted by the opening of switch 148 thereby resulting in the spring 88 biasing the tab 86 downwardly through the aligned slots 82, 94 (d) switch 162 moves to open position thereby latching solenoid 150 in position shown in FIG. 11, and (e) price switch 160 will be closed to cause a record to be produced for billing the customer by way of circuitry per se known to those skilled in the art.

After a customer has removed the article from the compartment, no further vending can take place until the door has been closed. Closing the door 32 results in the following happening simultaneously: (a) door extension 154 will open the price switch 160, (b) door extension 154 will close switch 162, (c) door 32 will pivot the latch 134 from the position shown in FIG. 11 to the position shown in FIG. 10 at which time spring 146 will move the lever 142 from the position shown in FIG. 11 to the position shown in FIG. 10, (d) switches 148 and 162 will be closed whereby solenoid 90 is activated, and (e) tab 86 will be moved upwardly out of the slot 94 by the solenoid 90.

If the customer tries to close door 32 without permitting the door 32 to move the latch 134, switch 148 will not be closed and no further vending can take place. Also, if the customer tries to move the latch 134 from the position shown in FIG. 11 to the position shown in FIG. 10 without the door 32 being embraced by the jaw 138, switch 162 will not be operated whereby no further vending can take place.

If additional purchases are desired, the above sequence is repeated. If no further purchases are desired, the customer removes his key from the key hole 122 thereby cutting power to the interlock solenoid 90 whereby tab 86 enters one of the slots 94 to prevent further rotation of the carousel 22. Also, removal of the key from the key hole 122 interrupts power to the solenoid 150 which prevents door 32 from being opened. Hence, it is not possible to rotate the carousel 22 nor is it possible to open the door 32.

The buttons 128 and 130 will be in series with buttons 124 and 126. Hence, only one button can be pushed at any given time. Pushing on one button such as button 124 automatically breaks the circuit to buttons 126, 128 and 130. All switches comparable to switches 148 and 162 will be in series. The solenoid of carousel 24 comparable to solenoid 90 will be in series therewith. Hence, one complete dispensing action must be persued as outlined above before proceeding with a second dispensing action.

The present invention may be embodied in other specific forms without departing from the spirit or essential attributes thereof and, accordingly, reference should be made to the appended claims, rather than to the foregoing specification as indicating the scope of the invention.

I claim:

1. Article dispensing apparatus comprising:

a. A housing, a rotatable article support in said housing, means supported by said housing for rotating said support, said support having a plurality of compartments, each compartment being open on the periphery of the support, b. A movable door on said housing opposite the open side of one of said compartments, c. An interlock supported by said housing for latching said article support in a dispensing position wherein one of said compartments has its open side opposite said door, d. A lock means supported by said housing for locking said door in a closed position, e. A detent means supported by said housing, said detent means being coupled to said lock means and said interlock for causing said lock means to block any opening movement of said door unless said article support is in a dispensing position so it can be latched by said interlock, said detent means being responsive to rotation of said article support and during such rotation prevents opening of said lock means, and f. means to open said lock means and for causing said interlock to latch said article support in a dispensing position while opening said door.

2. Article dispensing apparatus in accordance with claim 1 wherein said movable article support is a rotable carousel having a plurality of radially disposed compartments on its outer periphery, said carousel being supported within said housing for rotation about an upright axis.

3. Article dispensing apparatus in accordance with claim 1 wherein said movable door is supported by said housing for pivotable movement about an upright axis, said door at least in part being transparent, and spring means biasing said door to an open position.

4. Article dispensing apparatus in accordance with claim 1 wherein said lock means includes a latch, said latch having a jaw for embracing a free edge portion of said door, said latch being biased to an open position, and a lever movably supported for movement from a position wherein it blocks movement of said latch to a position wherein it permits movement of said latch in response to customer manipulation of an article selection means associated with said door.

5. Article dispensing apparatus in accordance with claim 4 including first and second switches in series with an electrical actuator for said interlock, said first switch being closed only when said door is closed, said second switch being closed only when said latch is in its closed position, said electrical actuator being part of (f) so that the article support remains latched until each of said first and second switches is closed.

6. Article dispensing apparatus in accordance with claim 1 including a key operable switch for coupling power to a discrete solenoid associated with each of said interlock and lock means.

7. Article dispensing apparatus in accordance with claim 1 including a second movable door on said housing opposite the open side of another compartment on said movable article support, said first mentioned door being opposite a different portion of said movable article support, a discrete article selection means on said housing for each of said doors, said doors being disposed one above the other, a discrete lock means for each of said doors, and each of said doors having a discrete means as set forth in (f).

8. Article dispensing apparatus comprising:

a. a housing, first and second rotatable article supports in said housing, each support having a plurality of compartments, each compartment being open on one side, b. a first movable door on said housing opposite the open side of one compartment on said first article support, a second movable door on said housing opposite the open side of one of said compartments on said second article support, c. first and second interlocks supported by said housing, each interlock being associated with a separate one of said article supports in a manner so as to latch its article support in a dispensing position wherein a compartment thereon has an open side opposite its associated door, d. a discrete lock means supported by said housing for separately locking each door in a closed position, e. a discrete detent means supported by said housing for each article support, each detent means being coupled to one of said lock means for causing the same to block any opening movement of the door associated therewith unless the associated article support is in a dispensing position so that it can be latched by its associated interlock, f. and separate means associated with opening of each door for causing the associated article support to be latched in its dispensing position.

9. Apparatus in accordance with claim 8 wherein said housing contains a central column, the lock means for each of said doors being supported by said central column, said lock means for each door including a discrete movable latch associated with each door, each movable latch being supported by said central column.

10. Article dispensing apparatus in accordance with claim 8 wherein each article support has a plurality of slots in a wall thereof uniformly spaced about a longitudinal axis thereof, and each interlock including a tab adapted to enter one of the slots on said article support associated therewith.

11. Article dispensing apparatus in accordance with claim 8 wherein each movable article support is a rotatable carousel having a plurality of radially disposed compartments on its outer periphery, each carousel being supported within said housing for rotation about an upright axis.

12. Article dispensing apparatus in accordance with claim 8 wherein each lock means includes a latch and an associated lever, each latch having a jaw for embracing a free edge portion of its associated door, each latch being biased to an open position, each lever being movably supported for movement from a position wherein it blocks movement of its associated latch to a position wherein it permits opening movement of its associated latch in response to customer manipulation of an article selection means associated therewith.

13. Article dispensing apparatus comprising:

a. A housing, a rotatable article support in said housing, manually operable means accessable on the front of and supported by said housing for rotating said support, said support having a plurality of compartments, each compartment being open on the periphery of the support, b. A movable door on said housing opposite the open side of one of said compartments, c. An interlock supported by said housing for latching said article support in a dispensing position wherein one of said compartments has its open side opposite said door, d. A lock means supported by said housing for locking said door in a closed position, e. A detent means supported adjacent the axis of rotation of said support, said detent means being coupled to said lock means and said interlock for causing said lock means to block any opening movement of said door unless said article support is in a dispensing position so it can be latched by said interlock, said detent means being responsive to rotation of said article support in clockwise and counterclockwise directions and during such rotation prevents opening of said lock means, and f. a release means for causing said lock means to open and for causing said interlock to latch said article support in a dispensing position, said release means being rendered inoperative by moving said door from an open position to a closed position to thereby unlatch said interlock and render said lock means operative.

* * * * *